United States Patent
Kujira et al.

(10) Patent No.: US 11,498,491 B2
(45) Date of Patent: Nov. 15, 2022

(54) VEHICLE STORAGE DEVICE

(71) Applicant: MORIROKU TECHNOLOGY COMPANY, LTD., Tokyo (JP)

(72) Inventors: Yuki Kujira, Tokyo (JP); Takeshi Itoh, Tokyo (JP)

(73) Assignee: MORIROKU TECHNOLOGY COMPANY, LTD., Tokyo (JP)

( * ) Notice: Subject to any disclaimer, the term of this patent is extended or adjusted under 35 U.S.C. 154(b) by 118 days.

(21) Appl. No.: 17/150,629

(22) Filed: Jan. 15, 2021

(65) Prior Publication Data

US 2021/0237654 A1 Aug. 5, 2021

(30) Foreign Application Priority Data

Jan. 31, 2020 (JP) .............................. JP2020-014990

(51) Int. Cl.
*B60R 7/04* (2006.01)
*E05B 83/32* (2014.01)

(52) U.S. Cl.
CPC ................ *B60R 7/04* (2013.01); *E05B 83/32* (2013.01); *E05Y 2201/628* (2013.01); *E05Y 2201/706* (2013.01); *E05Y 2900/538* (2013.01)

(58) Field of Classification Search
CPC ..... B60R 7/04; E05B 83/32; E05Y 2201/628; E05Y 2201/706; E05Y 2900/538; E05C 9/00; E05C 1/145
USPC .................................... 296/37.8, 24.34, 1.09
See application file for complete search history.

(56) References Cited

U.S. PATENT DOCUMENTS

| | | | | |
|---|---|---|---|---|
| 4,568,117 A | * | 2/1986 | McElfish | B60R 7/04 224/280 |
| 7,172,232 B2 | * | 2/2007 | Chiku | E05B 83/32 296/37.14 |
| 8,641,120 B2 | * | 2/2014 | Zimmerman | B60R 7/04 296/37.8 |
| 2003/0057709 A1 | * | 3/2003 | Hupfer | E05B 83/30 292/5 |
| 2009/0066103 A1 | * | 3/2009 | Koarai | B60N 2/753 296/1.09 |

(Continued)

FOREIGN PATENT DOCUMENTS

| | | |
|---|---|---|
| JP | H05-086696 U | 11/1993 |
| JP | 2006-297981 A | 11/2006 |

(Continued)

OTHER PUBLICATIONS

Japanese Office Action dated Sep. 13, 2022 issued in corresponding Japanese Application No. 2020-014990; English machine translation included (14 pages).

*Primary Examiner* — D Glenn Dayoan
*Assistant Examiner* — E Turner Hicks
(74) *Attorney, Agent, or Firm* — Rankin, Hill & Clark LLP

(57) ABSTRACT

A vehicle storage device includes a panel, a storage unit provided adjacent to the panel, having an opening in a certain part thereof, and capable of storing a person's goods and belongings therein, a lid which can open and close the opening, and a locking device capable of keeping the lid in a closed state. An operation unit includes a design surface that is exposed in a vehicle interior. One end of the operation unit design surface is substantially continuous from a design surface of the panel, and the other end of the operation unit design surface is positioned adjacent to the lid.

5 Claims, 13 Drawing Sheets

(56) References Cited

U.S. PATENT DOCUMENTS

2014/0062103 A1\* 3/2014 Gillis .................. E05B 77/42
                                                                               292/214
2022/0213728 A1\* 7/2022 Ilardo .................. B60L 53/30

FOREIGN PATENT DOCUMENTS

| JP | 2011-230736 A | 11/2011 |
|----|---------------|---------|
| JP | 2012-025178   | 2/2012  |
| JP | 2018-083575 A | 5/2018  |

\* cited by examiner

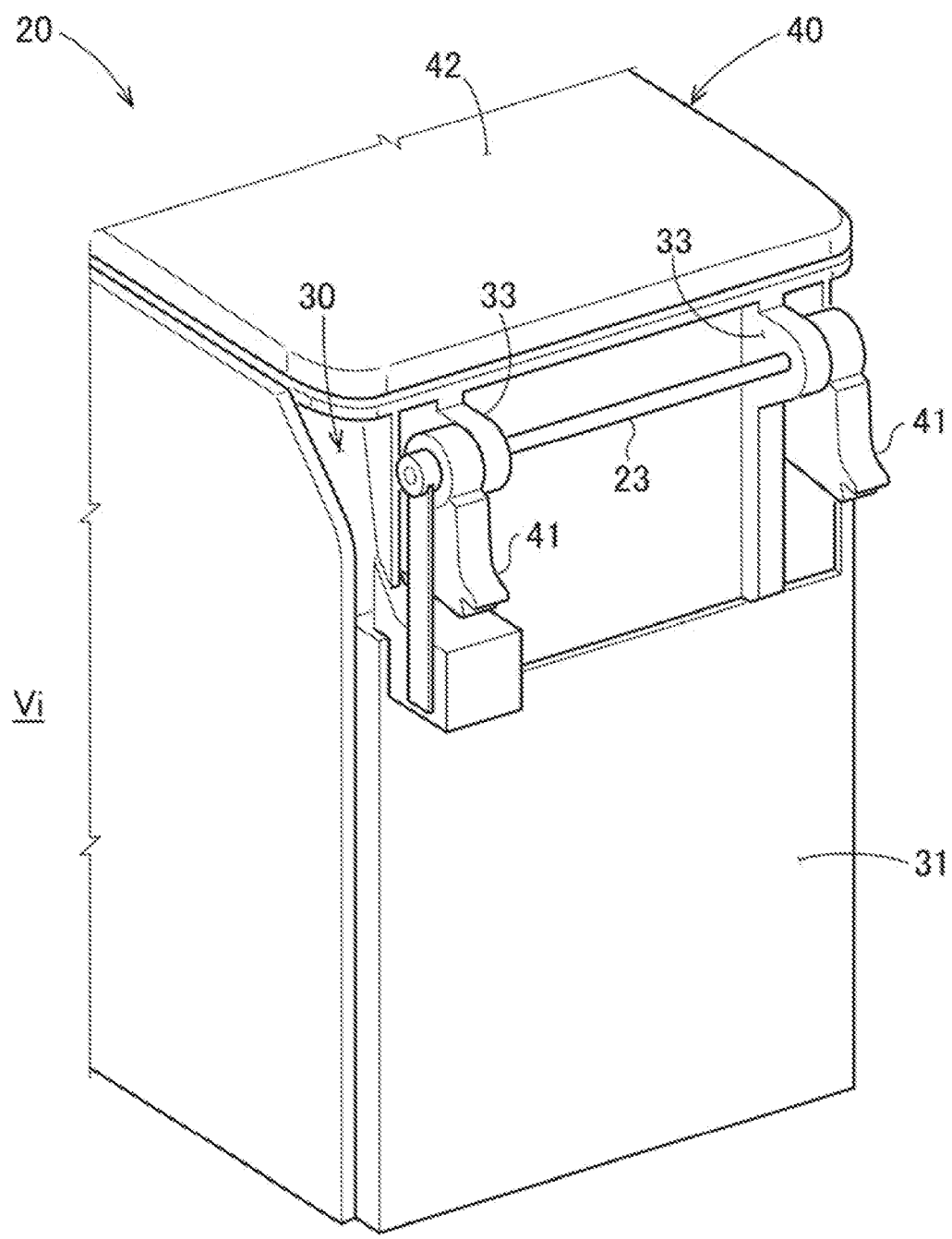
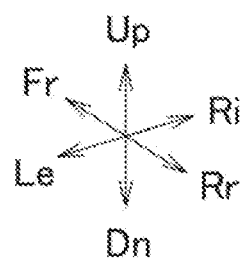
FIG.4

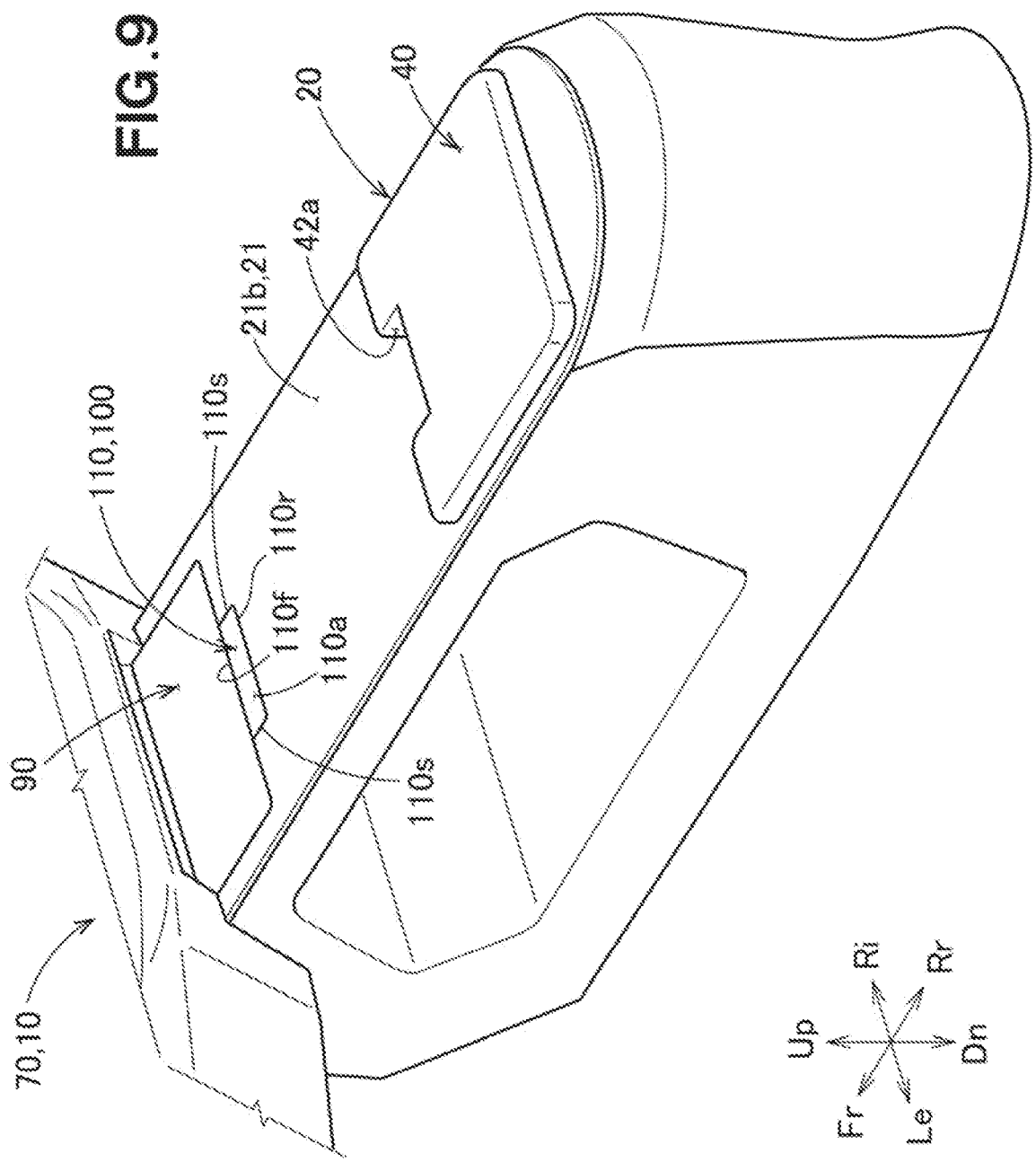

VEHICLE STORAGE DEVICE

FIELD OF THE INVENTION

The present invention relates to a vehicle storage device provided in a vehicle interior and configured to store goods and belongings of a person or persons in the vehicle.

BACKGROUND OF THE INVENTION

A vehicle interior is equipped with a storage device designed for use in the vehicle and capable of storing goods and belongings (i.e., things) of a person in the vehicle. One of the conventional storage devices for vehicles is disclosed in Japanese Patent Application Laid-Open Publication No. 2012-25178.

The storage device for a vehicle such as the storage device disclosed in Japanese Patent Application Laid-Open Publication No. 2012-25178 includes a storage portion whose top is open and which can store goods and belongings therein, a lid which can open and close the opening of the storage portion, and a locking device which is supported by the lid and can keep the lid in a closed state.

The locking device can prevent the lid from opening while the vehicle is traveling.

SUMMARY OF THE INVENTION

The vehicle storage device is a device that enters the view (field of view) of the person in the vehicle, and therefore highly sophisticated appearance (high level of appearance, good visual impression) is required.

An object of the present invention is to provide a vehicle storage device having highly sophisticated appearance.

According to one embodiment of the present invention, there is provided a storage device for a vehicle, including a panel that has a design surface exposed in an interior of the vehicle; a storage unit that is provided adjacent to the panel, has an opening in a predetermined part thereof, and can store things therein; a lid configured to open and close the opening of the storage unit; and a locking device configured to keep the lid in a closed state, the locking device including an operation unit that is supported by the panel and/or the storage unit and operated to release the lid from the closed state, and an engaging portion that is disengaged from the lid upon operating the operation unit, the lid having an engaged portion, which is engaged with the engaging portion, the operation unit having a design surface exposed in the interior of the vehicle, one end of the design surface of the operation unit being substantially continuous from the design surface of the panel, and an opposite end of the design surface of the operation unit being adjacent to the lid.

In the present invention, the operation unit is supported by the panel and/or the storage unit. If the operation unit is provided on the lid, the lid becomes thicker by an amount corresponding to the thickness of the operation unit. Thus, the lid protrudes from the panel. In order to avoid this, it is necessary to form the periphery of the operation unit in a concave shape to operate the operation unit, i.e., to secure a space for a user to place a finger. Because the structure of the invention supports the operation unit by the panel and/or the storage unit, it is possible to reduce the thickness of the lid. Therefore, the height different among the panel, the opera- tion unit and the lid is reduced, and it is possible to obtain a highly sophisticated appearance. According to the present invention, it is possible to provide a vehicle storage device having a highly sophisticated appearance.

BRIEF DESCRIPTION OF THE DRAWINGS

FIG. 4 is a perspective view of the vehicle storage device shown in FIG. 2 when viewed from the rear.

FIG. 9 is a perspective view of a console that includes a vehicle storage device according to a second embodiment of the present invention.

DETAILED DESCRIPTION OF THE PREFERRED EMBODIMENTS

Figure 1:
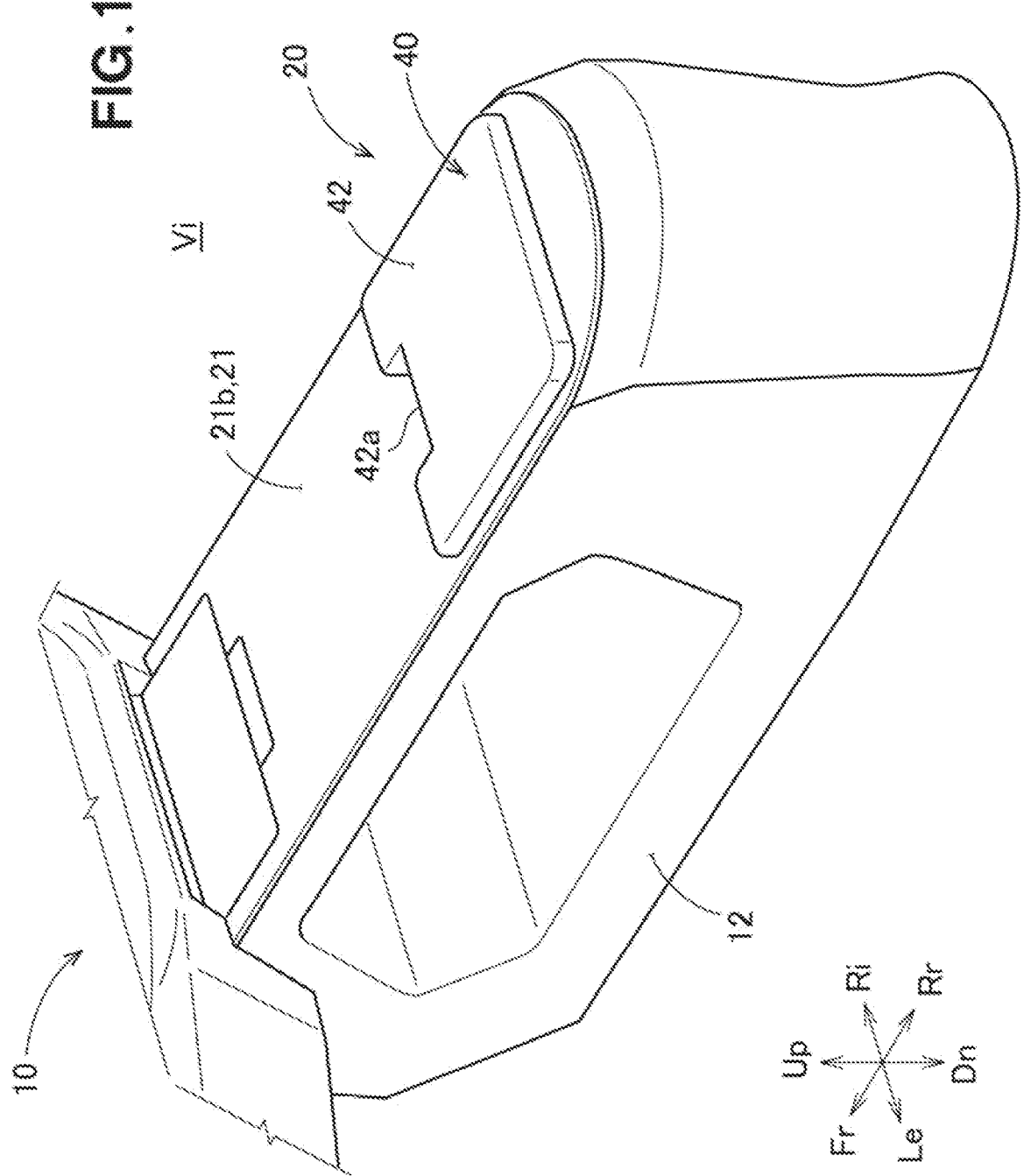
FIG. 1 is a perspective view of a console that includes a vehicle storage device according to a first embodiment of the present invention.

Embodiments of the present invention will be described below with reference to the accompanying drawings. In the following description, the terms "left" and "right" refer to the left and right when viewed from a person in a vehicle, and the terms "front" and "rear" refer to the front and rear when viewed in the traveling direction of the vehicle. In addition, "Fr" in the drawing represents the front, "Rr" represents the rear, "Le" represents the left when viewed from the person in the vehicle, "Ri" represents the right when viewed from the person in the vehicle, "Up" represents the top or up, and "Dn" represents the bottom or down.

First Embodiment

Figure 2:
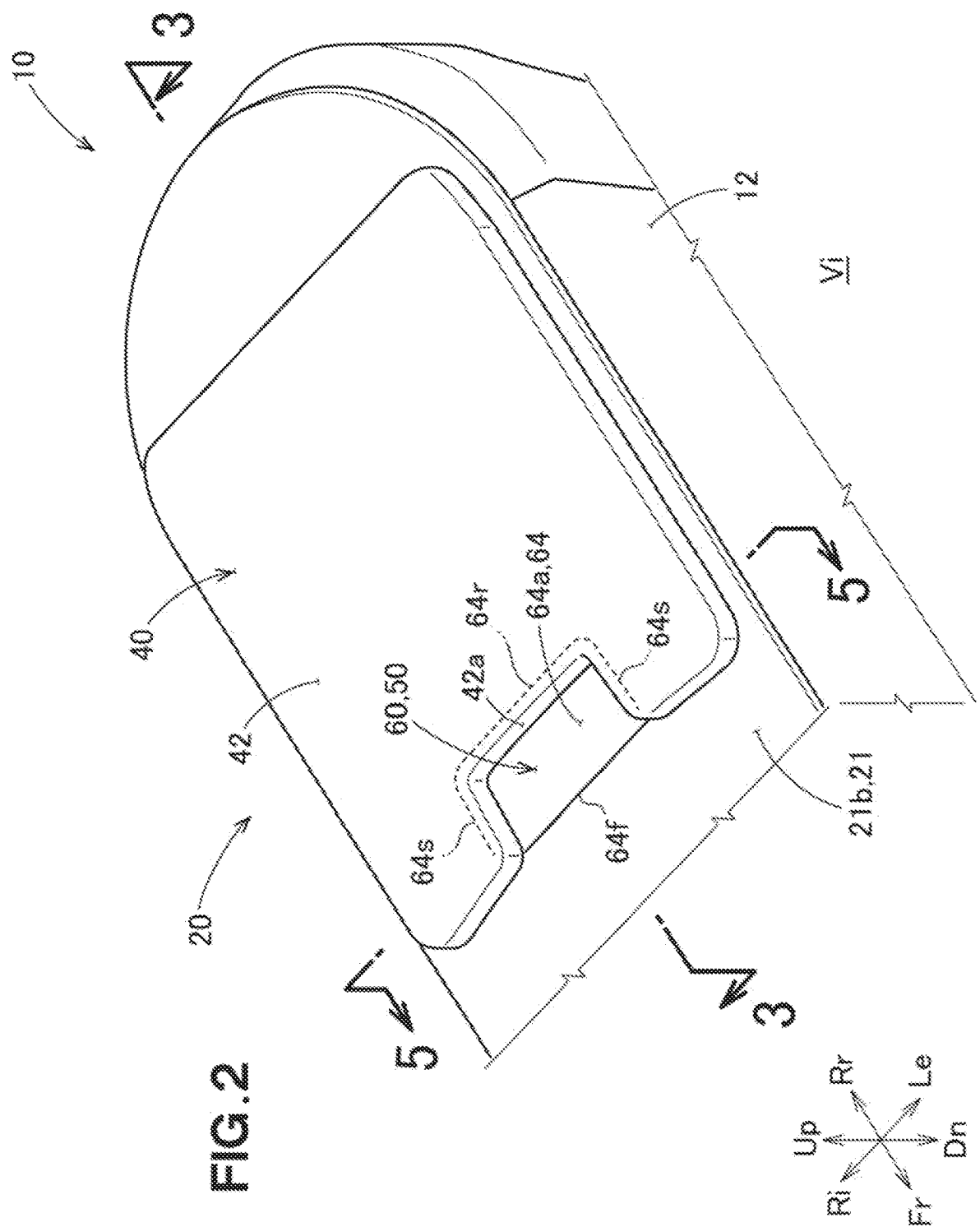
FIG. 2 is a perspective view of the vehicle storage device shown in FIG. 1 when viewed from an oblique upward position.

Referring to FIG. 1 and FIG. 2, a storage device for a vehicle 20 (hereinafter, referred to as storage device 20) is disposed in, for example, a console 10 provided on a lateral side of a driver's seat. The console 10 is situated at the center of a vehicle interior Vi and extends in the front-rear direction. The storage device 20 is provided in the rear area of the console 10 and can store things (goods and belongings) of a person in the vehicle.

Figure 3:
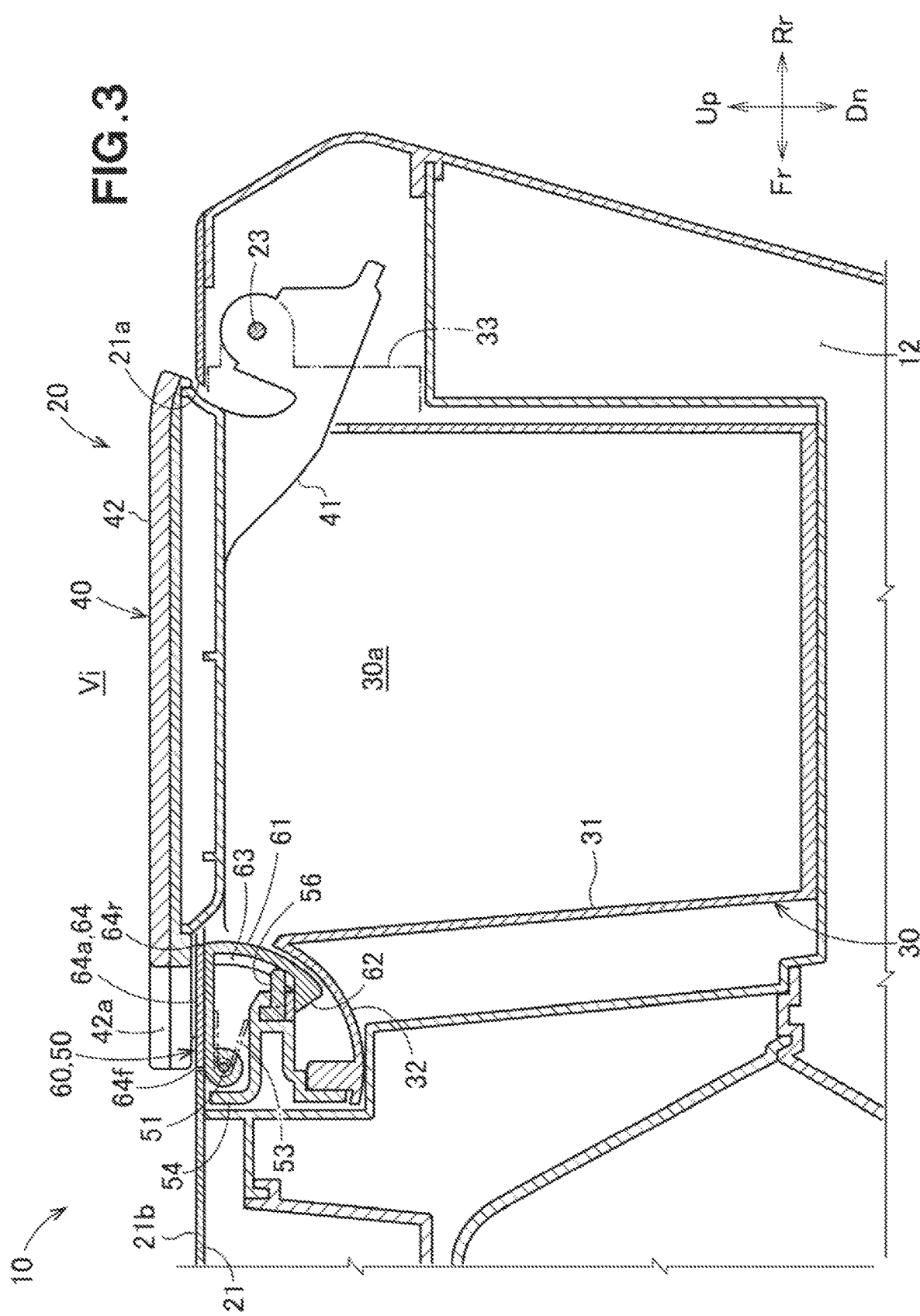
FIG. 3 is a cross-sectional view taken along the line 3-3 in FIG. 2.

Referring to FIG. 2 and FIG. 3, the storage device 20 includes a panel 21 which also serves as an upper surface portion of the console 10, a storage unit 30 which faces a panel opening 21a (i.e., an opening formed in the panel 21) and can store the person's goods and belongings therein, a round bar-shaped rotary shaft 23 of the storage unit 30 which is fixed to the rear of the storage unit 30, a lid 40 which is rotatably supported by the rotary shaft 23 and can open and close an opening 30a of the storage unit 30, and a locking device 50 which is located in front of (or in a front area) of the lid 40 and can keep the lid 40 in a closed state.

The panel 21 is a plate-shaped member whose upper surface (top surface) 21b is a design surface exposed in the vehicle interior Vi. It can be said that the upper surface 21b defines the design surface 21b of the panel 21. In the following description, the upper surface 21b is occasionally referred to as the design surface 21b.

Referring to FIG. 3 and FIG. 4, the storage unit 30 is a one-piece product made by resin molding. The storage unit 30 includes a box-shaped main body 31 of the storage unit whose top is open, a locking device supporting portion 32 which is integrally formed in front of the storage unit main body 31 and supports the locking device 50, and two bearing portions 33 and 33 which are integrally formed in the rear portion of the storage unit main body 31.

The lid 40 has a pair of hinge arms 41 and 41 which are supported by the storage unit rotary shaft 23, and a lid body 42 which is provided in front of the hinge arms 41 and 41, and covers an upper portion of the storage unit main body 31.

Figure 5:
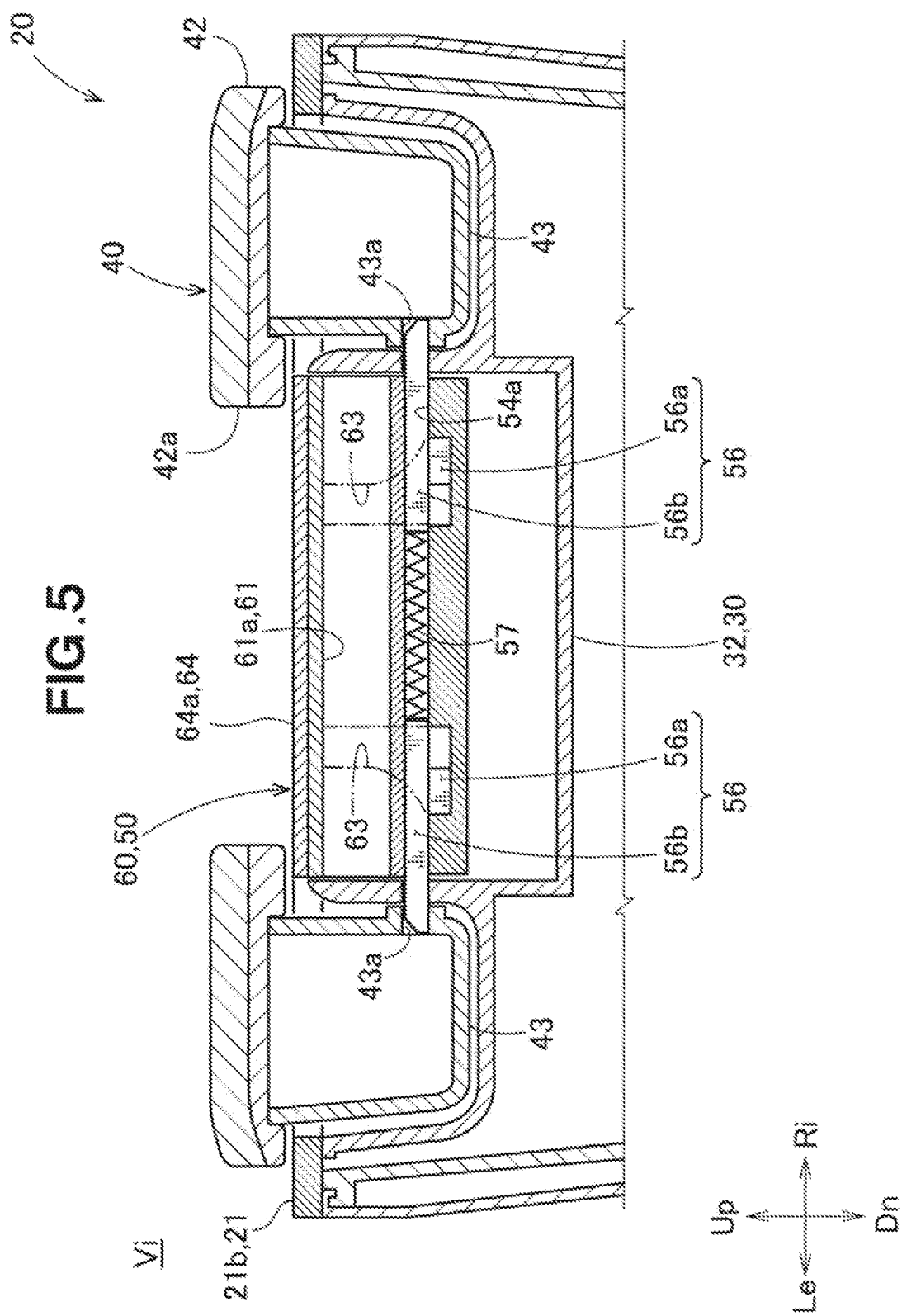
FIG. 5 is a cross-sectional view taken along the line 5-5 in FIG. 2.

Referring to FIG. 5, the lid 40 also includes engaged portions 43 and 43 which are formed at the lower portion of the front end of the lid body 42. The locking device 50 engages with the engaged portions 43 and 43.

Referring to FIG. 4, the hinge arms 41 and 41 are provided adjacent to the storage unit bearing portions 33 and 33, respectively.

Referring to FIG. 2, a center area of a front end of the lid body 42 is cut out toward the rear and defines a substantially U-shaped cut-out portion 42a.

Referring to FIG. 5, the engaged portions 43 and 43 are provided at two positions across the locking device 50, i.e., provided on the left and right of the locking device 50, respectively. The engaged portions 43 and 43 have holes (engaged holes) 43a and 43a, respectively, such that free ends of the locking device 50 are received in the holes 43a and 43a, respectively.

Referring also to FIG. 3, the locking device 50 includes a round bar-shaped rotary shaft 51 for an operation unit. The rotary shaft 51 is supported by the locking device support 32 and extends in the left-right direction. The locking device 50 also includes the operation unit 60 which is rotatably supported by the rotary shaft 51 and swung upward and downward by a user of the storage device 20, an operation unit spring 53 which biases the operation unit 60 upward, an engaging portion support 54 which is fixed to the locking device support 32, engaging portions 56 and 56 which are slidably supported by the engaging portion support 54 and engage with the engaged portions 43 and 43, respectively, and an engaging portion spring 57 which biases the engaging portions 56 and 56 toward the engaged portions 43 and 43.

Figure 6:
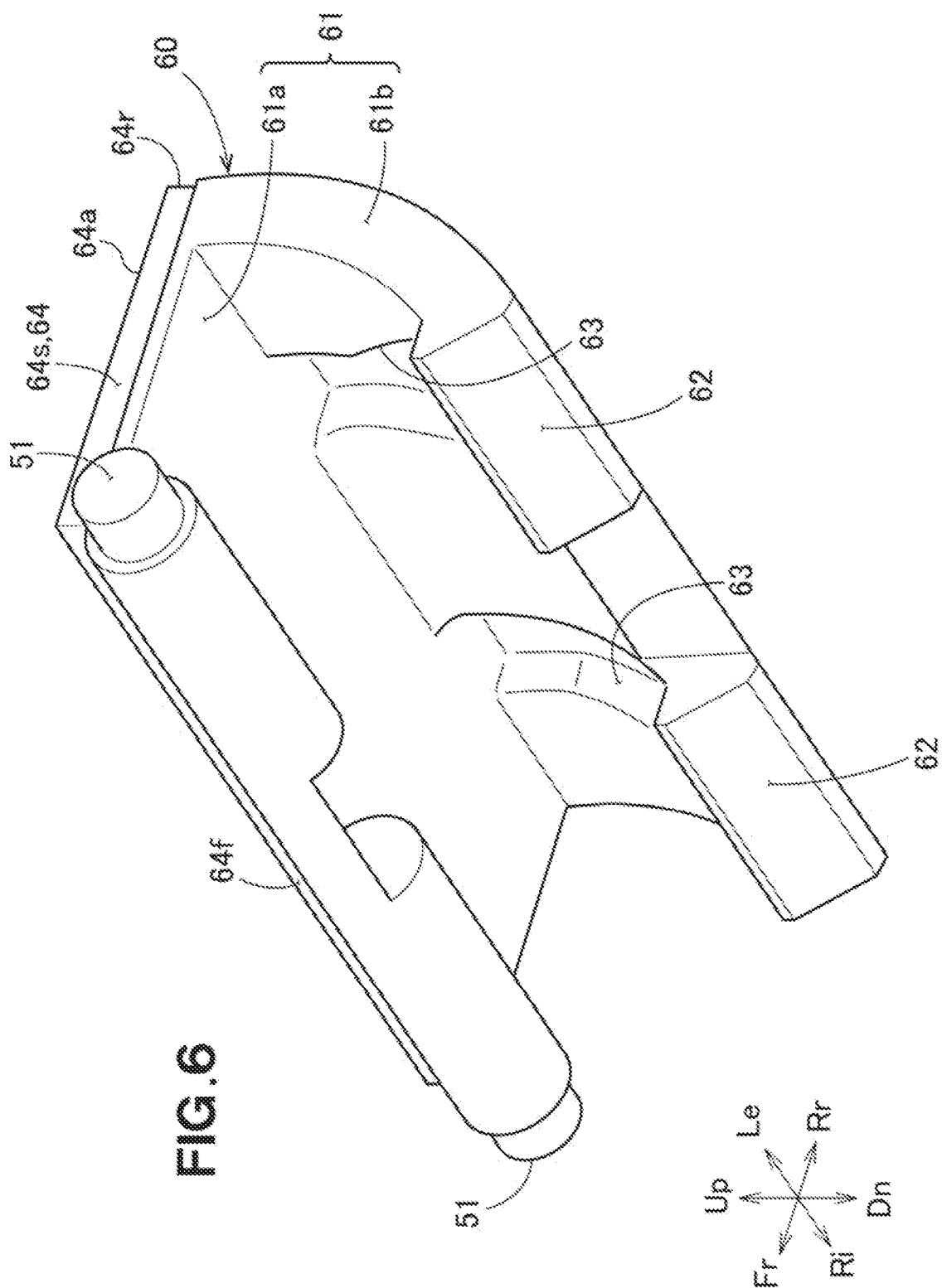
FIG. 6 is a perspective view of an operation unit shown in FIG. 2.

Referring to FIG. 6, the operation unit 60 includes an operation unit body 61 which has a substantially V-shape and whose front end (edge) is supported by the operation unit rotary shaft 51. The operation unit 60 also includes operation unit stoppers 62 and 62 which are integrally formed with a lower end of the operation unit body 61 to restrict (regulate) the upward rotation of the operation unit 60, abutting portions (contact portions) 63 and 63 which abut onto the engaging portions 56 and 56 (see FIG. 5) to regulate the positions of the engaging portions 56 and 56, and a decorative plate 64 which is disposed on an upper surface of the operation unit body 61 to increase the quality of the design (appearance) of the operation unit 60 or the storage device.

The operation unit body 61 includes an upper body 61a which is positioned in the upper area of the operation unit and visible from the vehicle interior, and a lower body 61b which extends downward and forward from the rear end of the upper body 61a and has an arcuate shape.

Each of the two abutting portions 63 and 63 is formed in a groove shape in the lower body 61b. The abutting portions 63 and 63 are formed obliquely such that the upper portions of the abutting portions 63 and 63 approach each other.

The upper surface of the decorative plate 64 is an operation unit design surface 64a that is exposed in the vehicle interior Vi.

Referring to FIG. 2, the right, left and rear edges of the decorative plate 64 are covered with the edge (periphery) of the cut-out portion 42a. On the other hand, other portions of the decorative plate 64 are exposed to the vehicle interior because the cut-out portion 42a is formed in the lid body 42. Thus, the front edge of the decorative plate 64 (the end along the operation unit rotary shaft 51 (see FIG. 6)) is visible from the vehicle interior Vi. In addition, the upper surface of the decorative plate 64 is situated substantially in the same plane as the design surface 21b of the panel 21. In other words, the operation unit design surface 64a is continuous from the design surface 21b of the panel 21.

Referring to FIG. 5, a receiving portion 54a for the engaging portions is formed in the engaging portion support 54 to receive the two engaging portions 56 and 56 and an engaging portion spring 57 disposed between the engaging portions 56 and 56.

Each of the engaging portions 56 and 56 has a pressed portion 56a which is pressed by the abutting portion 63 of the operation unit body 61, and a pin-shaped pin portion 56b which is integrally formed with the pressed portion 56a. The tip (head) of the pin portion 56b faces the interior of the hole 43a (the head of the pin portion 56b is received in the hole 43a).

The two engaging portions 56 and 56 are biased in the opposite directions by the engaging portion spring 57 such that the tails of the pin portions 56b and 56b are spaced apart from each other.

The engaging portions 56 and 56 which are received in the engaging portion receiving portions 54a are displaceable only in the lateral direction (right-left direction), i.e., the engaging portions 56 and 56 cannot move in the vertical direction (up-down direction). When the pin portions 56b and 56b of the engaging portions 56 and 56 are received in the holes 43a and 43a of the lid 40, the upward movement (displacement) of the lid 40 is restricted. That is, the lid 40 is kept in a closed state.

Figure 7A:
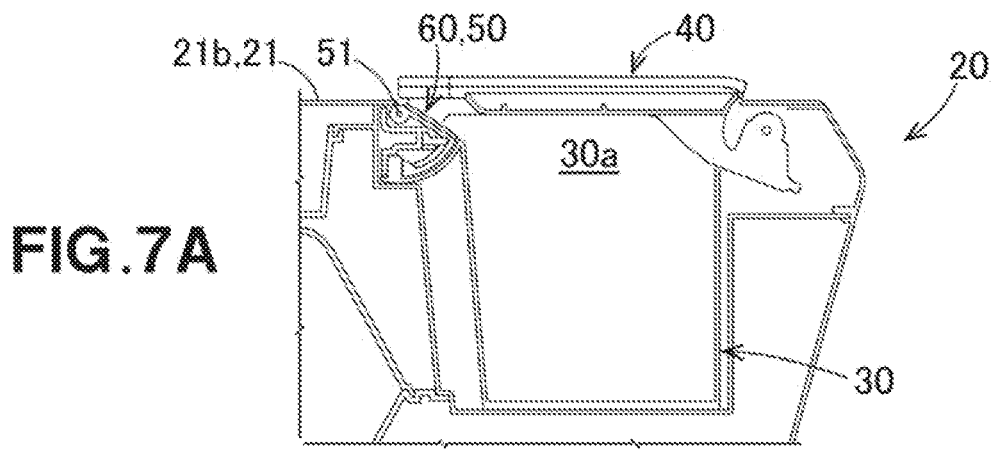
FIG. 7A is a view useful to describe an action of the vehicle storage device when the operation unit is pressed downward.

Referring to FIG. 7A, when a person in the vehicle wants to cause the lid 40 to swing upward and open the storage unit 30, the person presses (pushes) the operation unit 60 downward. As a result, the operation unit 60 swings downward about the rotary shaft 51 of the operation unit.

Figure 8A:
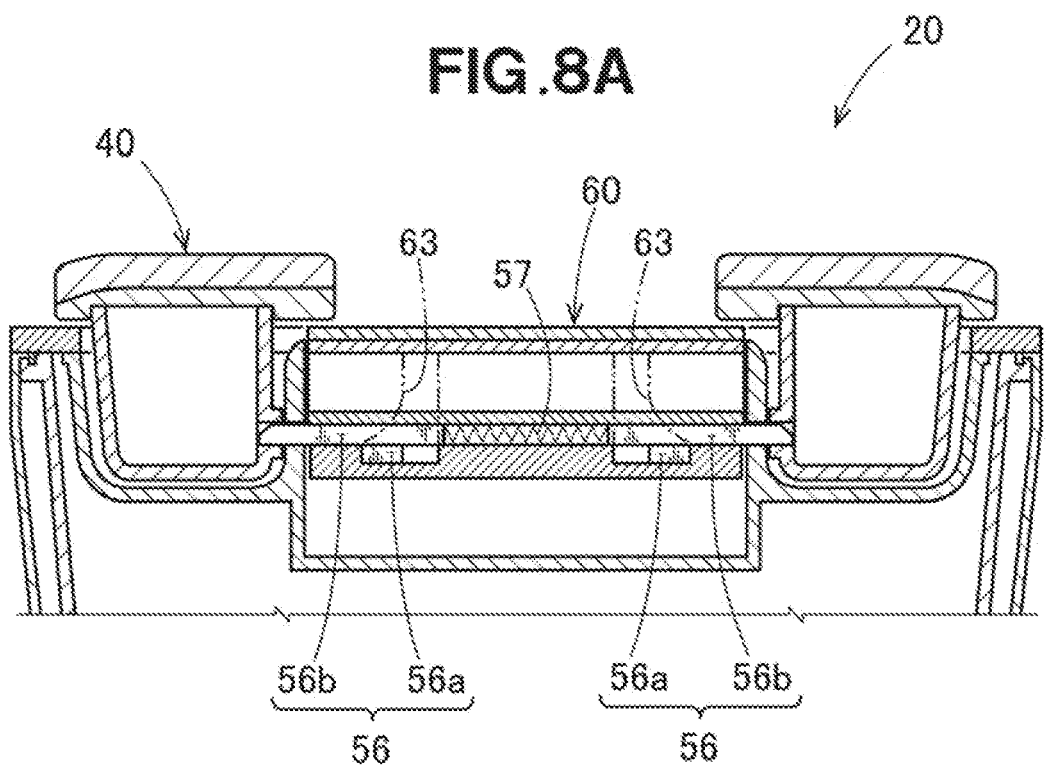
FIG. 8A is a view useful to describe a locking device in a locking condition.
Figure 8B:
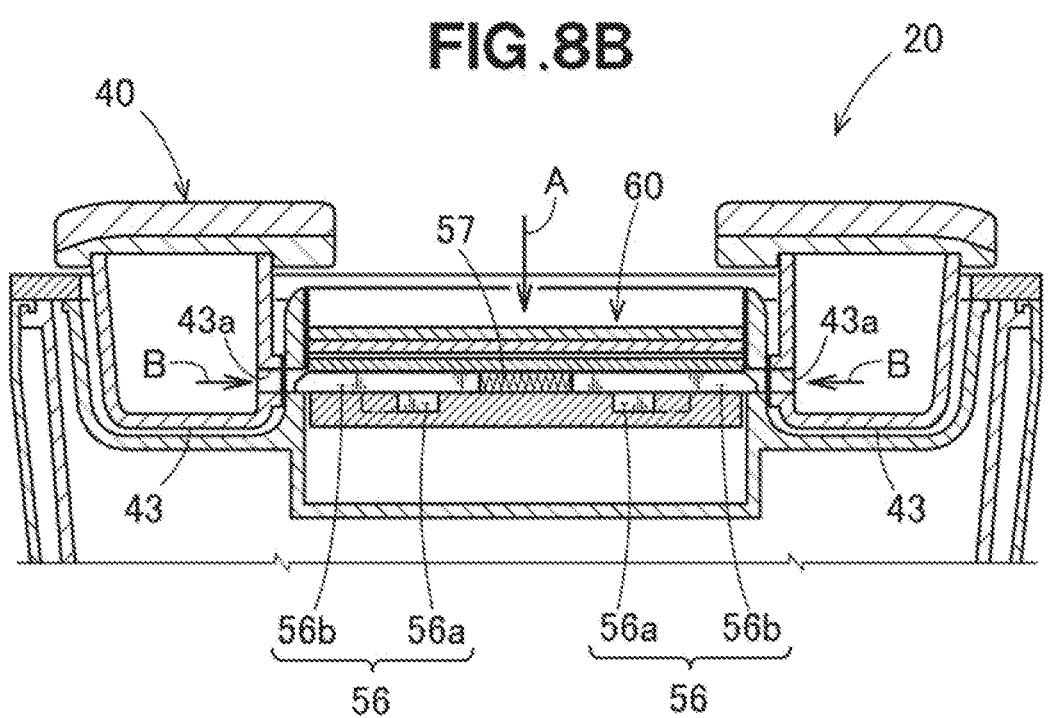
FIG. 8B is a view useful to describe the locking device in an unlocking condition.

Referring to FIG. 8A and FIG. 8B, as the operation unit 60 swings downward (see the arrow A in FIG. 8B), the engaging portions 56 and 56 are pushed downward toward the widthwise center of the device by the abutting portions 63 and 63 (see the arrow B in FIG. 8B).

This will be described in more detail. By pushing the operation unit 60 downward, those portions which are positioned above the abutting portions 63 and 63 are forced to abut onto the pressed portions 56a and 56a. As described above, the abutting portions 63 and 63 are inclined such that the abutting portions approach the widthwise center of the device as they go up. Thus, the pressed portions 56a and 56a are pushed downward against the biasing force of the engaging portion spring 57.

As the pressed portions 56a and 56a are pushed downward (depressed), the pin portions 56b and 56b which are integral with the pressed portions 56a and 56a exit from the holes 43a and 43a, respectively. Thus, the lock of the lid 40 is released (the lid 40 is unlocked).

Figure 7B:
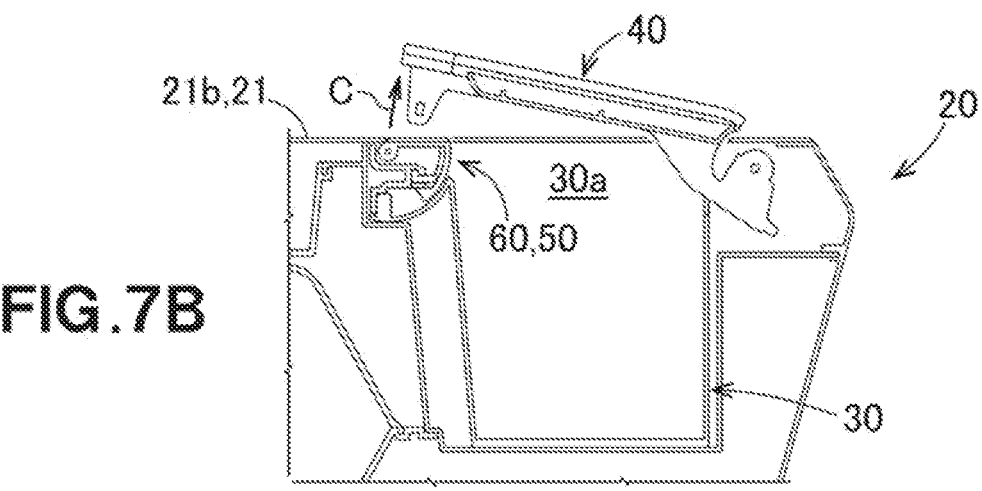
FIG. 7B is a view useful to describe an action of a lid when the lid is unlocked.
Figure 7C:
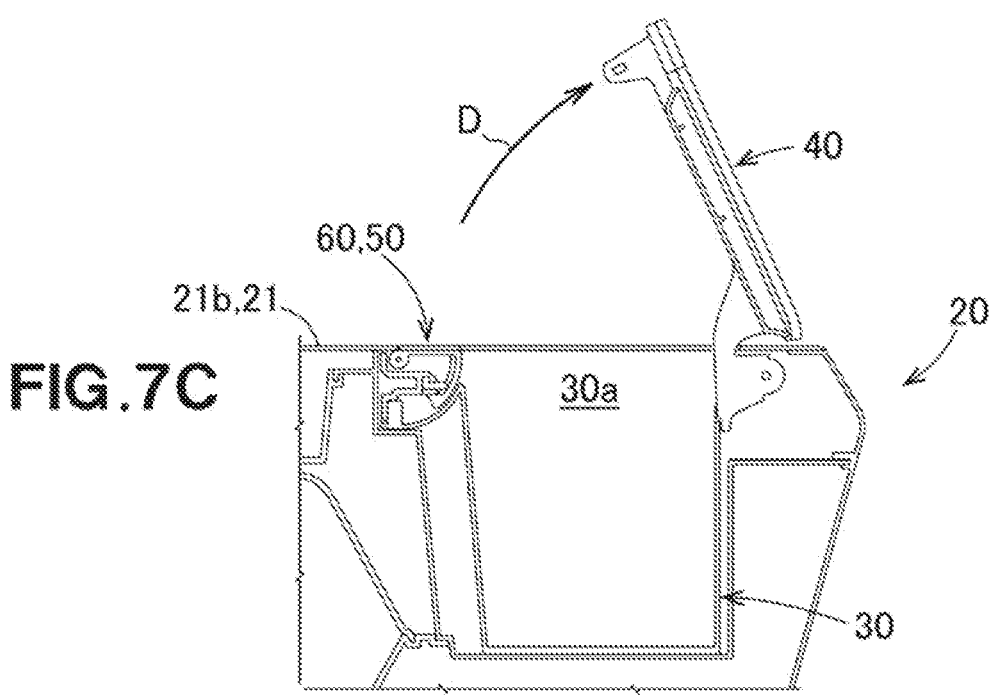
FIG. 7C is a view useful to describe an action of the lid that is moved beyond a certain angle.

Referring to FIG. 7B and FIG. 7C, the person in the vehicle pushes down the operation unit 60 with his/her finger (from the tip to the back of the finger), grasps the front end of the lid 40 and causes the lid 40 to swing backward and upward (see the arrow C and the arrow D). Thus, the upper portion of the storage unit 30 is opened. When closing the lid 40, the person in the vehicle grasps the front end of the lid 40 and causes the lid 40 to swing forward and downward.

It should be noted that the lid 40 may be biased upward by a spring, and the lid 40 may jump upward upon unlocking. Alternatively, a combination of a rotary damper and a spring may be used such that the lid 40 is caused to jump to a predetermined position by a biasing force of the spring and stop at the predetermined position by a damping force of the rotary damper.

The above-described storage device 20 is summarized below.

Referring to FIG. 3 and FIG. 5, the storage device 20 includes the panel 21, which has the design surface 21b exposed in the vehicle interior (compartment) Vi, the storage unit 30 provided adjacent to the panel 21 and having the opening 30a in its certain area to receive the person's goods and belongings therein, the lid 40 which can open and close the opening 30a of the storage unit 30, and the locking device 50 capable of keeping the lid 40 in the closed state, the locking device 50 includes the operation unit 60 which is supported by the storage unit 30 and operated to release the closed state, and the engaging portions 56 which are disengaged from the lid 40 upon operating the operation unit 60, the lid 40 has the engaged portions 43, with which the engaging portions 56 engage, the operation unit 60 includes the design surface 64a exposed in the vehicle interior Vi, one end 64f of the operation unit design surface 64a is continuous from the design surface 21b of the panel 21, and the other end (opposite end) 64r of the operation unit design surface Ma is adjacent to the lid 40.

The operation unit 60 of the locking device 50 is supported by the storage unit 30. If the operation unit 60 is provided on the lid 40, the lid 40 protrudes from the panel 21 by an amount corresponding to the thickness of the operation unit 60. Alternatively, it is necessary to form a concave portion in the periphery of the operation unit 60 to operate the operation unit 60 so that a space for the person to put his/her finger is secured. By employing the structure in which the operation unit is supported by the storage unit 30, it is possible to reduce the thickness of the lid 40. Therefore, the height difference among the panel 21, the operation unit 60 and the lid 40 is reduced. This imparts good appearance (highly sophisticated appearance). The present invention provides the storage device 20 having good appearance.

Incidentally, the locking device 50 may be supported by the panel 21. Alternatively, the locking device 50 may be supported by both the panel 21 and the storage unit 30. Even if the operation unit 60 is supported by the panel 21, or even if the operation unit 60 is supported by both the panel 21 and the storage unit 30, the storage device 20 achieves the above-described effects.

One end (edge) 64f of the operation unit design surface 64a is continuous from the design surface 21b of the panel 21, and the other end 64r of the operation unit design surface 64a is adjacent to the lid 40. That is, the panel 21, the operation unit 60 and the lid 40 are arranged adjacent to each other. Since the panel 21, the operation unit 60 and the lid 40 are provided close to each other, the integrated feeling is enhanced, and the appearance of the storage device 20 is further improved.

Preferably, the locking device 50 has the operation unit rotary shaft 51 extending along one end 64f of the operation unit design surface 64a, and the other end 64r of the design surface 64a can swing (pivot) about the operation unit rotary shaft 51. The swingable end 64r of the operation unit 60 and the lid 40 are arranged adjacent to each other. Therefore, it is possible to shorten the trajectory from a point of operating the operation unit 60 to a point of grasping the lid 40. It is, therefore, possible to provide the storage device 20 that has high operability.

Referring to FIG. 3 and FIG. 4, it is more preferable that the storage unit 30 has a pair of bearing portions 33 and 33 for the storage unit, the rotary shaft 23 of the storage unit is supported by a pair of bearing portions 33 and 33, the lid 40 includes the hinge arms 41 and 41 provided adjacent to the bearing portions 33 and 33, respectively, and the hinge arms 41 and 41 are rotatably supported by the rotary shaft 23 of the storage unit.

Because the rotary shaft 23 of the lid 40 is disposed near the rear end of the storage device and the locking device 50 is disposed near the front end, it is possible to hold the lid 40 in a stable manner and secure a stable swinging movement of the lid. In addition, as the lid 40 is grasped and lifted up (pivoting operation), the lock is released at the same time (because the back of the finger naturally pushes the operation unit upon grasping the lid). The operation of grasping the operation unit 60 becomes unnecessary, and it is not necessary to provide a space for receiving a finger in advance. Thus, it is possible to obtain a highly sophisticated appearance.

Referring to FIG. 2, it is more preferable that the lid 40 has the cut-out portion 42a, when viewed from the vehicle interior Vi, and the peripheral edge of the operation unit 60 is covered with the cut-out portion 42a.

Because the cut-out portion 42a is present, the person in the vehicle can easily grasp the lid 40. In addition, because the operation unit 60 is arranged at a position corresponding to the position of the cut-out portion 42a, it is possible to arrange the operation unit 60 and the lid 40 collectively in a neat manner. Furthermore, because the periphery of the operation unit 60 is covered with the lid 40, it is possible to prevent the boundary between the operation unit 60 and the lid 40 from appearing to a visible area. Thus, it is possible to provide the storage device 20 having a much highly sophisticated appearance.

In particular, it is preferred that the design surface 64a of the operation unit 60 has a substantially rectangular shape when viewed from the vehicle interior Vi, and one end (edge) 64f of the operation unit design surface 64a is only exposed in the vehicle interior Vi, and the remaining peripheral edges of the operation unit 60 are covered with the lid 40 such that other ends (edges) 64r, 64s and 64s become invisible.

Because one end 64f is exposed, it is easy for the person to find the location of the operation unit 60. Because other ends 64r, 64s and 64s are not visible from the vehicle interior Vi, it is possible to provide the storage device 20 having a highly sophisticated appearance with excellent operability.

Second Embodiment

Next, a storage device according to a second embodiment of the present invention will be described with reference to the accompanying drawings.

Figure 10:
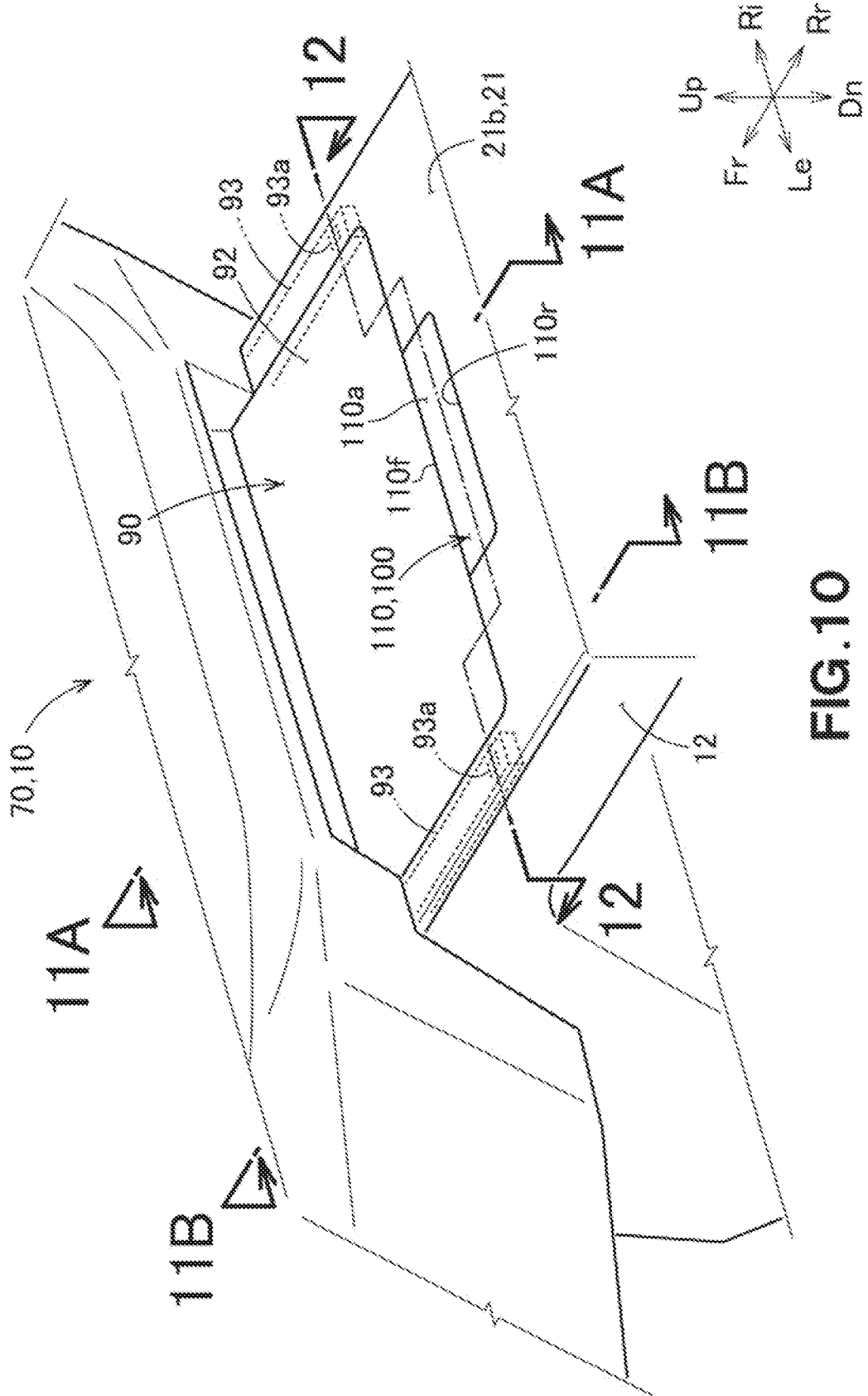
FIG. 10 is a perspective view of the vehicle storage device shown in FIG. 9 when viewed from an oblique upward position.

Reference is made to FIG. 9 and FIG. 10. FIG. 9 and FIG. 10 show a console 10 in which the storage device 70 according to the second embodiment is provided. The storage device 70 of the second embodiment is a slide-type storage device provided in the front area of the console 10. For parts, portions and elements common to the first embodiment, the same reference numerals are used, and a detailed description thereof will be omitted.

Figure 11A:
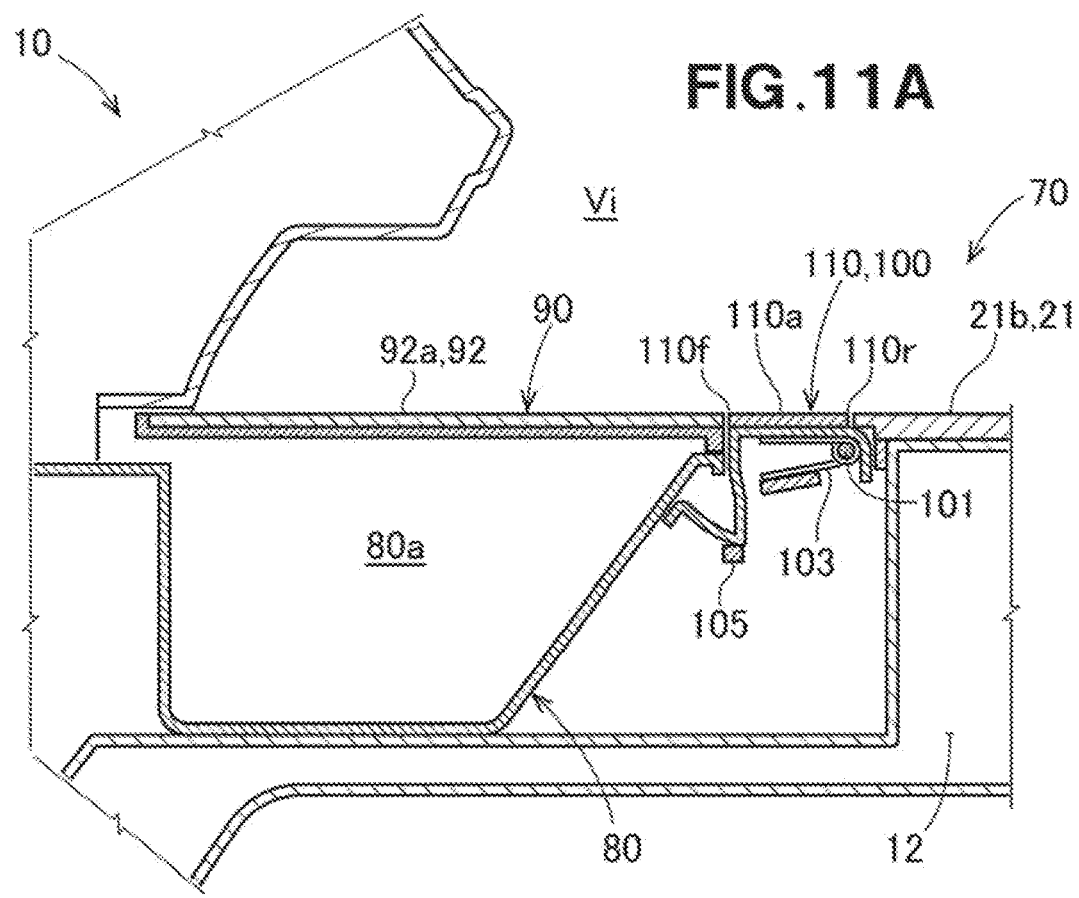
FIG. 11A is a cross-sectional view taken along the line 11A-11A in FIG. 10.
Figure 11B:
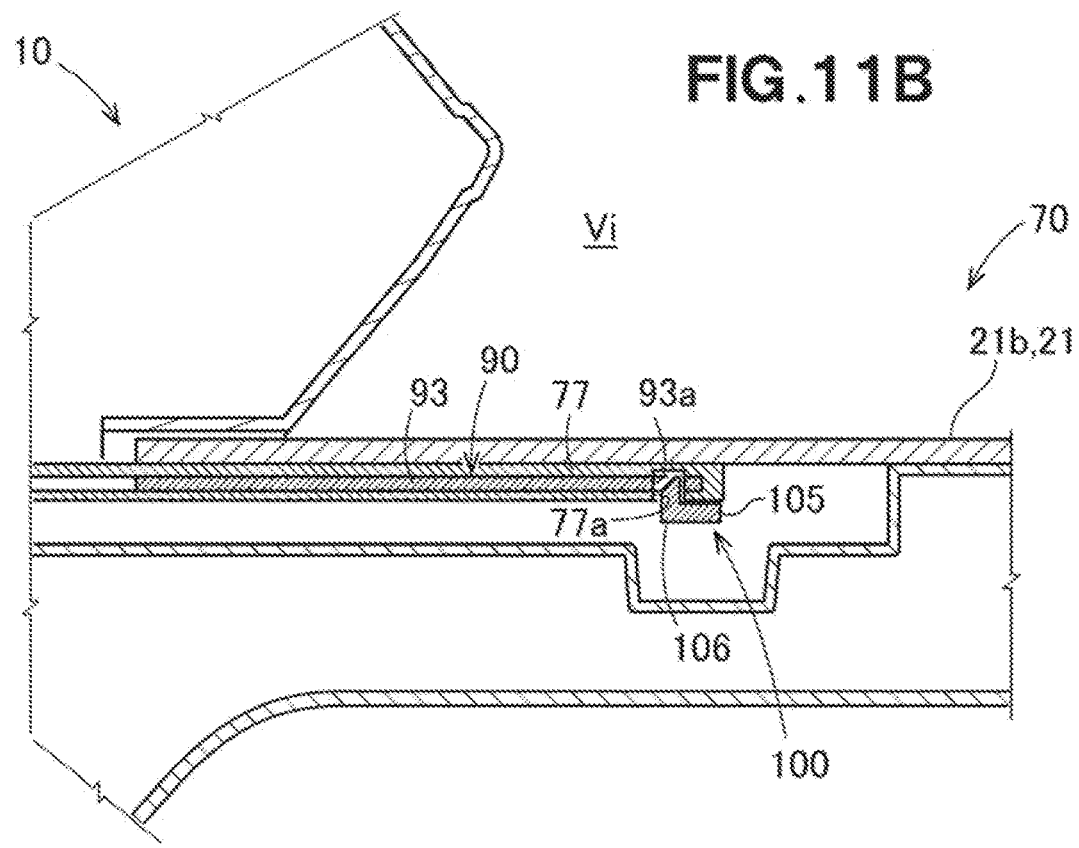
FIG. 11B is a cross-sectional view taken along the line 11B-11B in FIG. 10.
Figure 12:
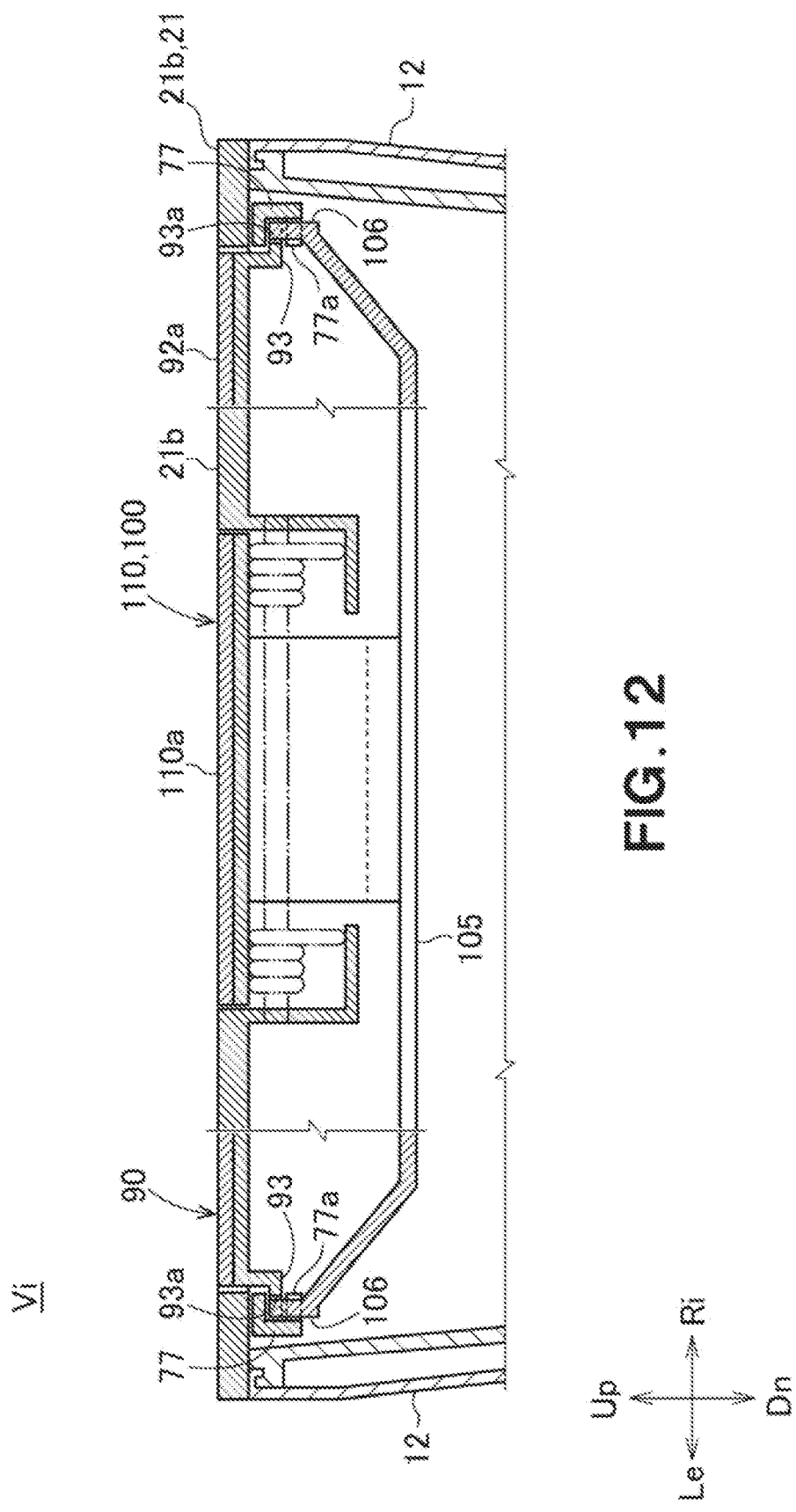
FIG. 12 is a cross-sectional view taken along the line 12-12 in FIG. 10.

Referring to FIG. 11A, FIG. 11B and FIG. 12, the storage device 70 includes a panel 21 which also serves as an upper surface portion of the console 10, a storage unit 80 which is provided in front of (or in a front area of) the panel 21 and can store the goods and person's belongings therein, rail portions 77 and 77 which are provided in the upper area of the storage unit 80 and fixed to the right and left side walls 12 and 12 of the console 10, respectively, a lid 90 supported by the rail portions 77 and 77 such that the lid 90 can slide in the front-rear direction and can open and close an opening 80a of the storage unit, and a locking device 100 which is provided in the rear of the lid 90 and can keep the lid 90 in a closed state.

The storage unit 80 is made of resin. Small goods such as keys and smartphones can be placed in the storage unit 80.

Referring to FIG. 12, each of the right and left rail portions 77 and 77 has a substantially U-shape which opens toward the lateral direction (right-left direction) center of the storage device 70. The rear portion of each of the rail portions 77 and 77 has a rail hole 77a with which the locking device 100 engages.

The lid 90 includes a lid body 92 which covers the upper portion of the storage unit 80 (see FIG. 11A), and slider portions 93 and 93 which extend toward the rail portions 77 and 77 from the right and left edges of the lid body 92, respectively and can slide along the rail portions 77 and 77, respectively.

The rear portion of each of the slider portions 93 and 93 has a slider hole 93a with which the locking device 100 engages. The location of the slider hole 93a coincides with the location of the rail hole 77a when the lid 90 is in the closed state.

Referring also to FIG. 11A, the locking device 100 includes a round bar-shaped rotary shaft 101 for an operation unit, extending in the right-left direction, an operation unit 110 rotatably supported by the rotary shaft 101 such that a person in the vehicle can cause the operation unit 110 to swing upward and downward, an operation unit spring 103 which biases the operation unit 110 upward, a lock arm 105 which abuts onto the operation unit 110 and extends in the right-left direction, and engagement portions 106 and 106 formed at right and left free ends of the lock arm 105 and received in the slider holes 93 and 93a and the rail holes 77a and 77a, respectively.

The upper surface of the operation unit 110 is an operation unit design surface 110a that is exposed in the vehicle interior Vi.

One end 110r of the operation unit design surface 110a is continuous from the design surface 216 of the panel 21.

The other end 110f of the operation unit design surface 110a is adjacent to the lid 90 and is continuous with the design surface 92a of the lid 90.

It can be said that the slider holes 93a and 93a are the engaged portions 93a and 93a, with which the engaging portions 106 and 106 engage, respectively.

Figure 13A:
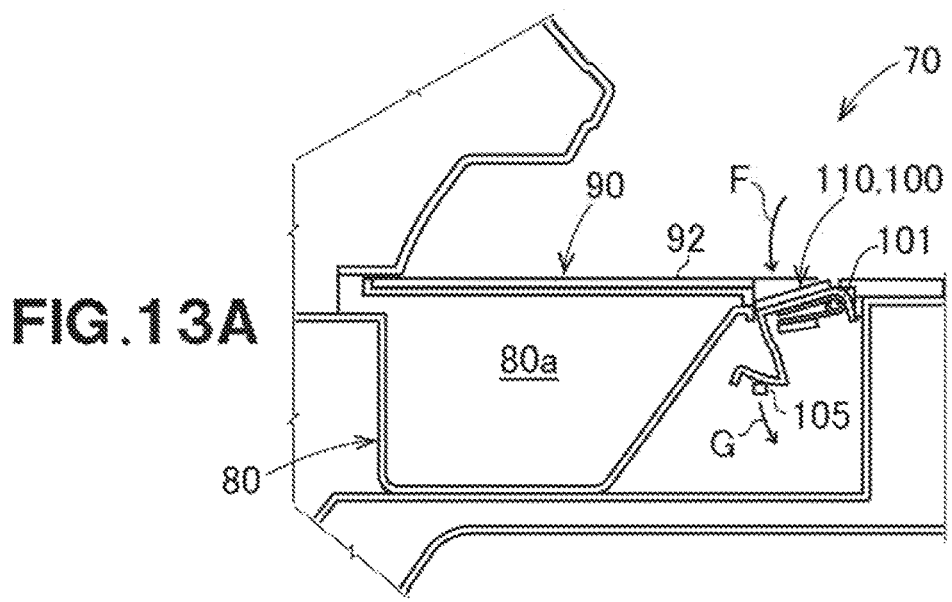
FIG. 13A is a view useful to describe an action of the vehicle storage device when the operation unit is pressed downward.

Referring to FIG. 13A, when a person in the vehicle wants to slide the lid 90 forward to open the storage unit 80, the person pushes the operation unit 110 downward (see the arrow F). Upon depressing the operation unit 110, the lock arm 105 is pushed downward by the operation unit 110 (see the arrow G). Thus, the person in the vehicle can visually recognize the rear end face (edge face) of the lid 90 and can push the lid 90.

Figure 13B:
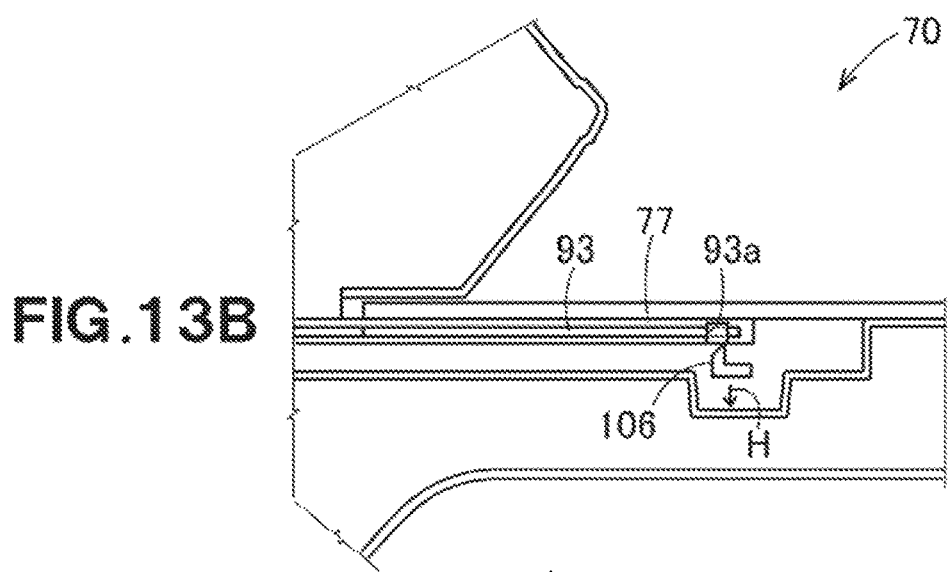
FIG. 13B is a view useful to describe a locking device in an unlocking condition.

Referring also to FIG. 13B, as the lock arm 105 is pushed down, the engaging portions 106 and 106 are also pushed down (see the arrow H), and are disengaged from the portions 93a and 93a, respectively. This releases the lid 90 from the locked state.

Figure 13C:
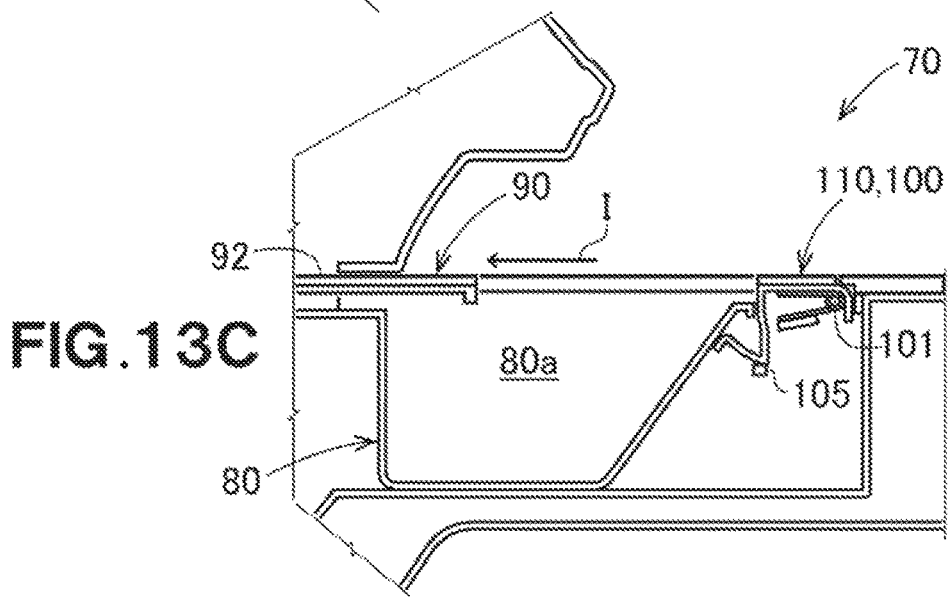
FIG. 13C is a view useful to describe an action of a lid in an unlocked condition.

Referring to FIG. 13C, after releasing the locked state (unlocking the lid), the person in the vehicle slides the lid 90 forward (see the arrow I). Thus, the storage unit 80 is opened. When the lid 90 is in the fully open state, the front end of the lid 90 is held (caught) by a latch mechanism (not shown). Thus, it is possible to prevent the lid 90 from being closed by vibration or the like during travel of the vehicle.

When the person in the vehicle wants to close the lid 90, the person pushes the lid 90 forward. Upon pushing the lid 90 forward from the lid full open state (upon causing the overstroke of the lid), the latching mechanism is released (unlatched), and the lid 90 is sudden backward by the reaction force of the spring so that the lid 90 is fully closed.

The above-described storage device 70 also provides the predetermined effects of the present invention.

Referring to FIG. 11A and FIG. 11B, a pair of rail portions 77 and 77 are also provided in the upper area of the storage unit 80, and the lid 90 has the slider portions 93 and 93 which are slidably supported on the rail portions 77 and 77, respectively.

It is possible to stably support and slide the lid 90, and the unlocking is achieved upon pushing the rear end of the lid 90 (sliding operation). Further, without providing the lid 90 with a concave portion or a convex portion for the person to grip the lid 90, it is possible to perform the sliding of the lid in the front-read direction. Thus, it is possible to impart a highly sophisticated appearance to the storage device.

Preferably, the panel 21, the operation unit 110 and the lid 90 are arranged in the same plane. This provides the storage device 70 having particularly high design properties.

It should be noted that although the storage device according to the present invention has been described based on the embodiments in which the storage device is provided in the console, it is also applicable to a glove box or the like. That is, the storage device can be provided at various locations in the vehicle interior, and use of the storage device is not limited to the illustrated and described embodiments.

The locking device may be provided at an end of the lid, rather than at the widthwise center of the lid.

The embodiments may be appropriately and partially combined with each other. For example, the upper surface of the rear lid 40 may be continuous with the design surface 21b of the panel 21, and may be continuous with the design surface 64a of the operation unit 60. Further, the front operation unit 110 may be surrounded by the cut-out portion 42a.

In other words, as long as the operations and effects of the present invention are achieved, the present invention is not limited to the embodiments.

The storage device of the present invention is suitable for console.

What is claimed is:

1. A vehicle storage device comprising:
a panel that comprises a design surface exposed in an interior of a vehicle;
a storage unit that is provided adjacent to the panel, comprises an opening in a predetermined part thereof, and can store things therein;
a lid configured to open and close the opening of the storage unit, the lid comprising an engaged portion; and
a locking device configured to keep the lid in a closed state,
the locking device comprising an operation unit that is pivotally supported by the panel and/or the storage unit and operated to release the lid from the closed state, the locking device including an engaging portion that is disengaged from the engaged portion of the lid upon operating the operation unit,
the operation unit comprising a design surface exposed in the interior of the vehicle,
one end of the design surface of the operation unit being substantially continuous from the design surface of the panel, and
an opposite end of the design surface of the operation unit being adjacent to the lid,
wherein the locking device further includes a rotary shaft that extends along, and generally parallel to, the one end of the design surface of the operation unit, and the opposite end of the design surface of the operation unit is configured to swing about the rotary shaft of the locking device as the engaging portion is disengaged from the engaged portion of the lid.

2. The vehicle storage device according to claim 1, wherein the storage unit comprises a pair of bearing portions,
a rotary shaft of the storage unit is supported by the pair of bearing portions of the storage unit,
the lid comprises a pair of hinge arms that are provided adjacent to the pair of bearing portions of the storage unit, respectively, and
the pair of hinge arms being rotatably supported by the rotary shaft of the storage unit.

3. A vehicle storage device comprising:
a panel that comprises a design surface exposed in an interior of a vehicle;
a storage unit that is provided adjacent to the panel, comprises an opening in a predetermined part thereof, and can store things therein;
a lid configured to open and close the opening of the storage unit; and
a locking device configured to keep the lid in a closed state,
the locking device comprising an operation unit that is supported by the panel and/or the storage unit and operated to release the lid from the closed state, and an engaging portion that is disengaged from the lid upon operating the operation unit,
the lid comprising an engaged portion, which is engaged with the engaging portion,
the operation unit comprising a design surface exposed in the interior of the vehicle,
one end of the design surface of the operation unit being substantially continuous from the design surface of the panel,
an opposite end of the design surface of the operation unit being adjacent to the lid,
wherein a pair of rails are provided above or in an upper area of the storage unit, and
the lid comprises a pair of slider portions that are slidably supported by the pair of rails, respectively.

4. The vehicle storage device according to claim 1, wherein the design surface of the panel, the design surface of the operation unit and a surface of the lid are situated in a substantially same plane.

5. The vehicle storage device according to claim 1, wherein the lid comprises a cut-out portion when viewed from the interior of the vehicle, and a periphery of the operation unit is covered with the cut-out portion.

\* \* \* \* \*